United States Patent [19]
Nepustil

[11] Patent Number: 5,930,339
[45] Date of Patent: Jul. 27, 1999

[54] LEAVING A MESSAGE ON A HELD CONNECTION

[75] Inventor: Vladimir Nepustil, Boulder, Colo.

[73] Assignee: Lucent Technologies Inc., Murray Hill, N.J.

[21] Appl. No.: 08/744,209

[22] Filed: Nov. 5, 1996

[51] Int. Cl.[6] .................................................. H04M 1/64
[52] U.S. Cl. ...................... 379/88.26; 379/77; 379/215; 379/393
[58] Field of Search ................................ 379/67, 88, 89, 379/214, 215, 393, 68, 70, 77, 265, 88.16, 88.22, 88.23, 88.24, 88.25, 88.26

[56] References Cited

U.S. PATENT DOCUMENTS

| | | | |
|---|---|---|---|
| 4,834,551 | 5/1989 | Katz ........................................ | 379/393 |
| 5,309,512 | 5/1994 | Blackmon et al. ...................... | 379/215 |
| 5,511,112 | 4/1996 | Szlam ........................................ | 379/88 |
| 5,668,853 | 9/1997 | Florence et al. ........................ | 379/215 |

*Primary Examiner*—Fan S. Tsang
*Attorney, Agent, or Firm*—Werner Ulrich

[57] ABSTRACT

This invention relates to arrangements for leaving messages from a held telephone. A recording device or system attached to the held telephone station, to a PBX or to a central office switch records the message in response to a request from the held party. Advantageously, this permits a party who has been put on hold by another party a third alternative between the presently allowed alternatives of hanging on or hanging up; a message may be all that is needed and the held party can be saved from frustration.

9 Claims, 3 Drawing Sheets

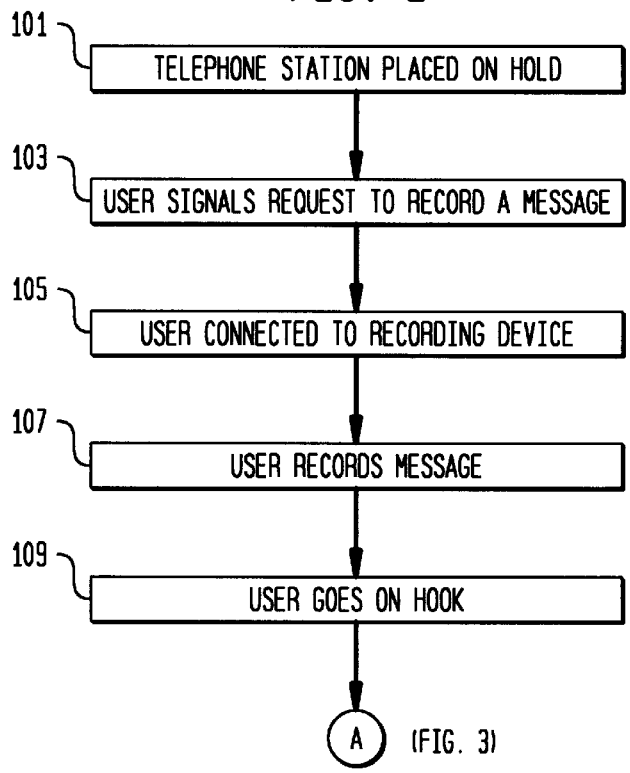
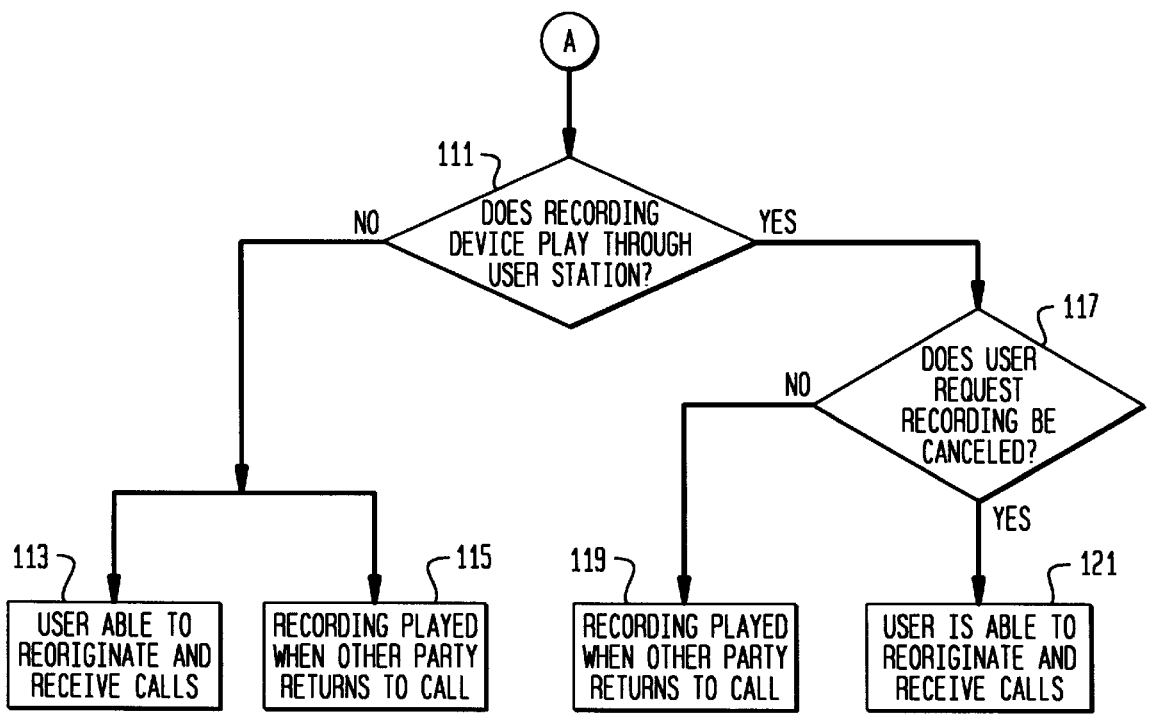

LEAVING A MESSAGE ON A HELD CONNECTION

TECHNICAL FIELD

This invention is related to leaving messages on telephone calls.

PROBLEM

Telephone callers are frequently placed on hold while the party with whom they are talking answers another call, places another call to find information, or otherwise temporarily disconnects from a conversation. Under these circumstances, the party that has been placed on hold has two choices: the party can either wait until the other party returns to the other conversation, or can hang up (disconnect). A disconnect is frustrating for both parties and a wait, especially when the wait is of an indefinite length, can be annoying to the waiting party. This unfortunate situation is a problem of the prior art.

SOLUTION

The above problem is substantially alleviated and an advance is made over the teachings over the prior art, in accordance with this invention, wherein the party who has been put on hold can arrange to leave a message for the holding party, the message to be delivered as soon as the holding party signals for a return to the conversation.

In accordance with one implementation of applicant's invention, a recording device is associated with the held party's telephone. When the held party is put on hold, the held party records a message in the recording device and can then disconnect; as soon as the holding party returns from hold, the message is played to the holding party and the held party is disconnected; if the holding party disconnects rather than returning from hold, the held party also disconnects.

In accordance with another implementation of applicant's invention, the recording arrangement is in a central office switching system (switch) or a private branch exchange (PBX) of the held party. In this case the switch or PBX remains connected to the trunk being used for the conversation and plays back the recording as soon as the holding party returns from hold to the conversation. Advantageously, such an arrangement allows the held party to make another call during the holding interval and reduces the amount of costly customer premises equipment required by the held party.

The recording arrangement can also be provided by the holding party's switch or PBX. The party placed on hold receives an announcement and is connected to a recording device; the held party can then choose to leave a message or hold on until the holding party returns to the call. This arrangement can be advantageously tied to call waiting as a packaged service since in call waiting one of the calls is frequently put on hold. Advantageously, it is not required that the held party have any special service in order to be able to leave the message.

BRIEF DESCRIPTION OF THE DRAWING

FIGS. 2–4 are flow diagrams illustrating the operation of applicant's invention.

DETAILED DESCRIPTION

Figure 1:
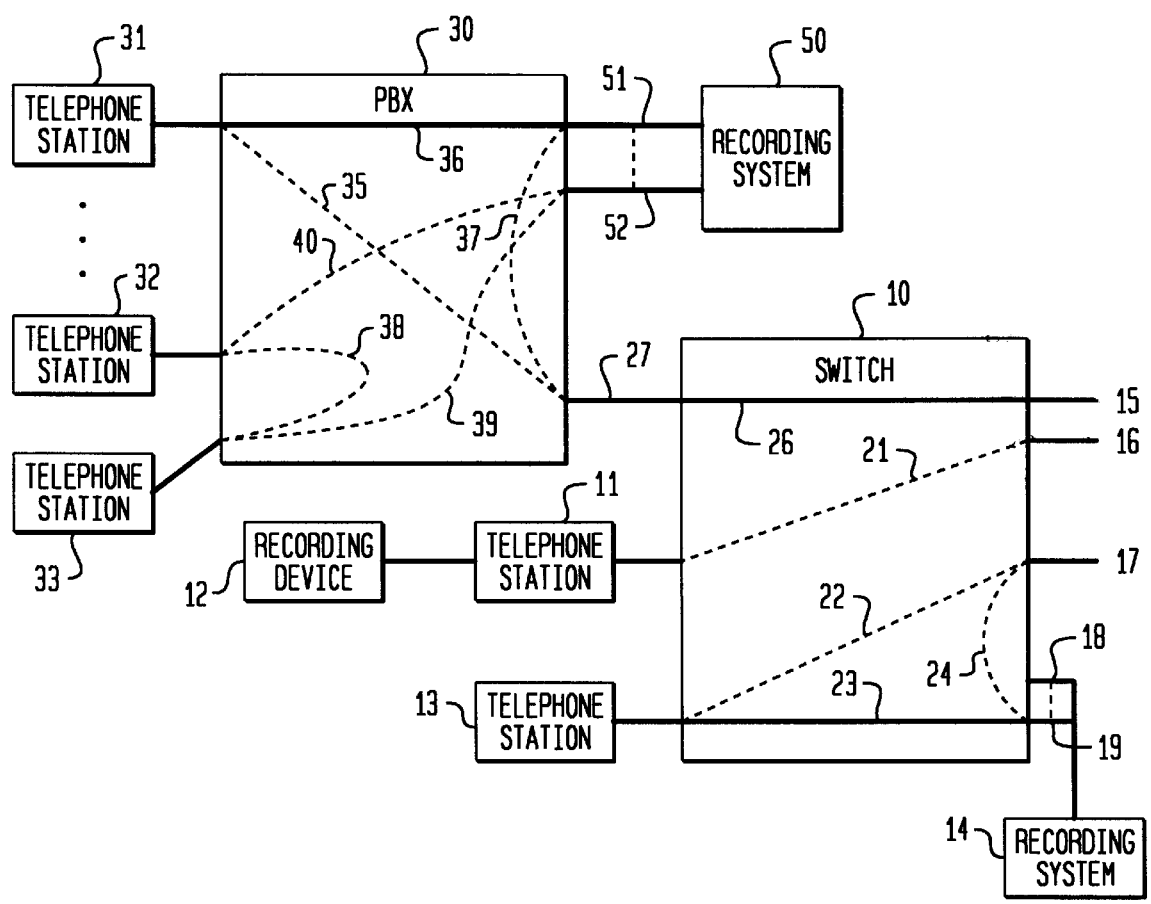
FIG. 1 is a block diagram illustrating the telephone connections used in implementing applicant's invention.

FIG. 1 is a system diagram illustrating the operation of applicants' invention in a number of its embodiments. Shown are a switch 10 which is a central office switch. Also shown is a private branch exchange (PBX) 30 located at a customer's premises for handling communications among stations of that customer and also for handling incoming and outgoing communications to and from the public switched telephone network (PSTN). In order to illustrate one embodiment of the invention, telephone station 11 is shown which has an attached recording device 12. This recording device can be readily adapted from existing answering machines. This can be done, for example, by adding a supplementary outgoing announcement arrangement, triggered by a button indicating that a new message is to be recorded; following a transition by the telephone station from a held state to a state wherein incoming signals are detected, the new message is played. The recording device performs a number of functions in applicants' embodiment. When the user of telephone station 11 presses an appropriate button the recording device is alerted to record the message by the user of telephone station 11. The end of the message is signaled by the user of telephone station 11 pressing another or the same button. After a message has been recorded, the recording device continues to stay on the line connecting telephone station 11 to switch 10 even though telephone station 11 has gone on-hook. As soon as recording device 12 recognizes that the holding party, i.e., the party that placed telephone station 11 on hold, has gone from hold back to an active connection, recording device 12 will play the recorded message. Recording device 12 detects the transition of the holding station back to the communicating mode by any of a number of well known methods, for example, by detecting the presence of signals in the voice band. After the recording device has finished playing the message it will disconnect itself and telephone station 11 from the line to switch 10, thus enabling the user of telephone station 11 to re-originate and/or receive incoming calls. Advantageously, this arrangement requires only a small amount of customer station equipment to implement the invention and does not require any equipment in the switch 10, nor does it require special translation information in switch 10, whose administration would involve the local carrier.

Another implementation is shown with respect to telephone station 13 which, as can be seen from the diagram, does not have any special station equipment associated with the station for this feature. Telephone station 13 is originally connected by connection 22 to an interoffice trunk 17 or to another station (not shown) that is also attached to switch 10. The connection 22 is shown in dashed form to indicate that it has been placed on hold. Telephone station 13 then signals a request to switch 10 to be connected to recording system 14 via connection 23.

Recording system 14 can handle a plurality of calls simultaneously and is connected to a plurality of ports 18, . . . , 19. Connection 23 is to port 19 connected to recording system 14. The telephone stationed 13 then transmits a message to recording system 14, telephone station 13 disconnects and switch 10 establishes a held connection 24 between port 19 and trunk 17. Alternatively, no hold is required but trunk 17 is monitored to detect when the holding party goes from hold to a communicating state. In either case when this change of the holding party is detected, recording system 14 is connected to trunk 17 and the message previously recorded by the user of telephone station 13 is played to the holding party. Advantageously, in this arrangement telephone station 13 is free to make outgoing calls or receive incoming calls as soon as it has finished recording its message on recording system 14.

Telephone stations 31, ..., 32, 33 are connected to PBX 30 which in turn is connected to serving switch 10 by a plurality of trunks including PBX trunk 27. The stations of PBX 30 are served by a centralized recording system 50. Recording system 50 is connected to the PBX by a plurality of connections to ports 51, ..., 52 of the PBX 30. Alternatively, those stations which want the record on hold feature can be equipped with a recording device 12 and a call is treated essentially in the same way as previously described with respect to telephone station 11. In the example shown in the diagram, telephone station 31 has previously been connected over a connection 35 through the PBX trunk 27 and connection 26 in switch 10 to interoffice trunk 15. The holding party who is connected to interoffice trunk 15 has placed telephone station 31 on hold and the initial configuration is a hold connection 35 between PBX trunk 27 and telephone station 31. If the user of telephone station 31 now wishes to record a message to be delivered to the holding party, the user presses a button and telephone station 31 signals to PBX 30 to request a connection to recording device 50. The user of telephone station 31 is connected by PBX connection 36 to port 51 of the group of ports 51, ..., 52 that are connected to the recording system 50. Telephone station 31 records a message and then disconnects. Recording system 50 then establishes a held connection 37 to PBX trunk 27; as soon as the holding party connected to interoffice trunk 15 returns to the call, the recording system 50 plays the recorded message to the holding party. Advantageously, this arrangement also allows the user of telephone station 31 to make outgoing calls, and receive incoming calls after recording a message; since telephone station 31 is connected to PBX 30, the user can also participate in intra-PBX calls on PBX 30.

FIG. 1 also illustrates the case in which telephone station 32 is involved in an intra-PBX call with telephone station 33 over connection 38. Telephone station 33 places telephone station 32 on hold and the hold connection 38 now connects these two telephone stations. If at this point the user of telephone station 32 wishes to leave a message for telephone station 33 then the user presses a button and telephone station 32 will signal a request for a connection to recording system 50. A connection 40 is established between telephone station 32 and recording device 50 using port 52. After the user of telephone station 32 has finished recording a message, the user disconnects and instead of having a held connection 38 between telephone stations 33 and 32, there is a held connection 39 between recording system 50 and telephone station 33. As soon as telephone station 32 goes from the holding state to the communicating state, recording system 50 will play the message back to telephone station 33. Advantageously, in this arrangement the recording system can be used not only for calls between the PBX and the public switched telephone network, but also for intra-PBX calls.

Figure 4:
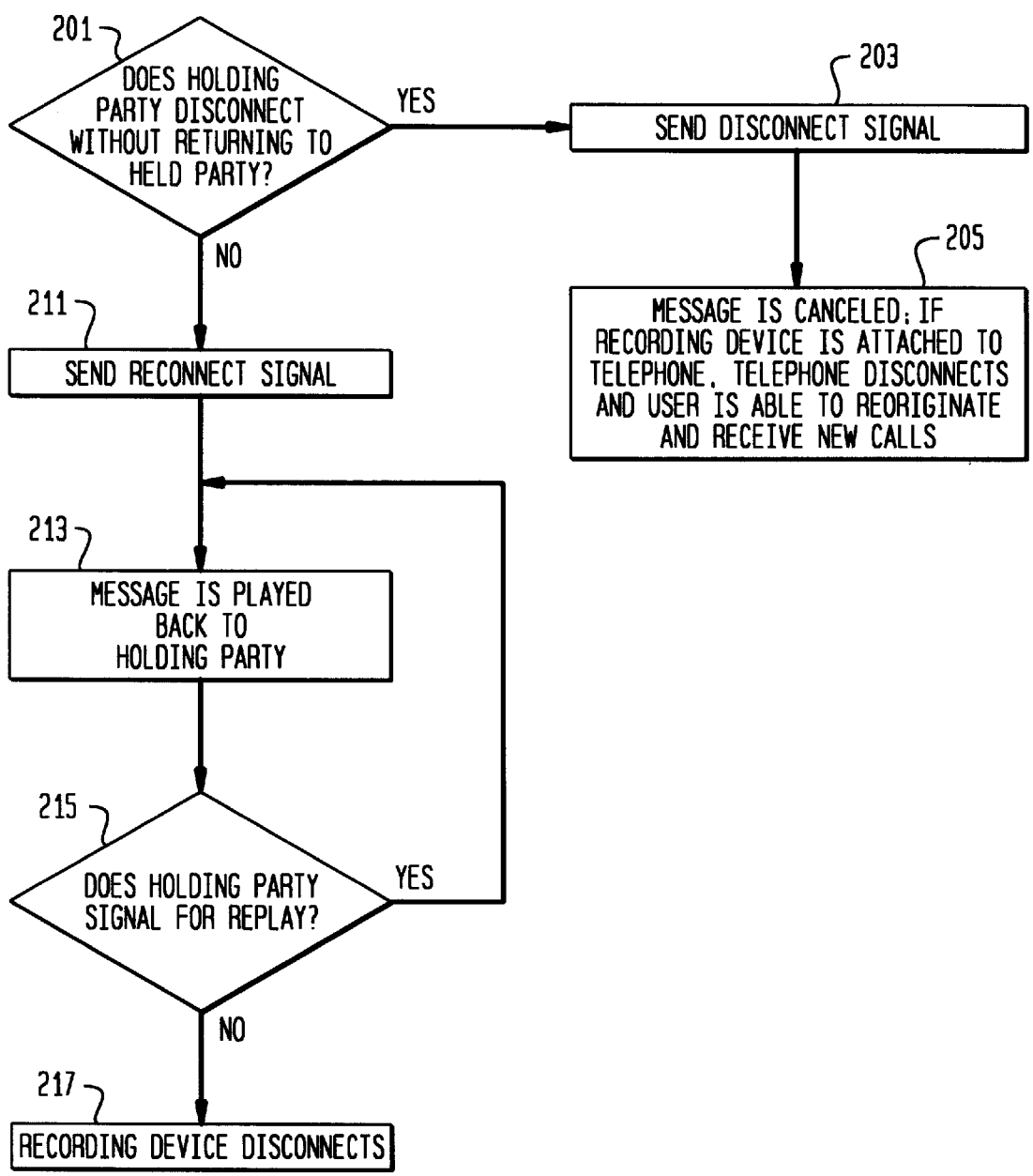

FIGS. 2 and 3 are flow charts illustrating the operation of applicants' invention from a point of view of the held party and the recording device or system. FIG. 4 is a flow chart illustrating the operation of applicants' invention from the point of view of the holding party and the recording device or system.

In Block 101 of FIG. 2, the held party is placed on hold. The user at the held party's telephone station signals to request the recording device of system to record a message (Action Block 103). The held user is then connected to the recording device either through a switched connection or, in the case of recording device 12 attached to telephone station 11, simply through the activation of the recording device. The held user then records a message (Action Block 107) and the held user goes on-hook (Action Block 109). The actions are continued on FIG. 3. Test 111 determines whether the recording device plays through the user's station. If not, i.e., in the case of a switch or PBX supplied recording system, the user is able to re-originate and receive calls (Action Block 113) and the recording is played whenever the holding party returns to the call (Action Block 115). If the recording device plays through the user's station, test 117 determines whether the user has requested that the recording be canceled. If so, then the recording is canceled and the user is able to re-originate and receive calls (Action Block 121). If the user has not requested that the recording be canceled, then whenever the holding party returns to the call, the recording is played back to the holding party (Action Block 119). Note that if the holding party hangs up without returning to the call, the disconnect is detected, the recording cleared, and the user is able to re-originate and receive calls.

FIG. 4 shows actions within the recording device or system and also shows actions from the point of view of the holding party. Test 201 determines whether the holding party disconnects without returning to the call with the held party. If so, then a disconnect signal is sent (Action Block 203) and the message is canceled and, if the recording device is attached to the telephone, the telephone disconnects and the user is able to reoriginate and receive new calls (Action Block 205). If the holding party does return to the call, then the holding party sends a reconnect signal (Action Block 211). The recording device or system then plays the message back to the holding party (Action Block 213). Test 215 is used to determine whether the holding party signals for a replay of the message. This is an important feature since the message might contain a telephone number which might not be intelligible on a first hearing. If the holding party does not signal for a replay then the recording device disconnects (Action Block 217). If the holding party does signal for replay, then Action Block 213 is re-entered. For alternative embodiments of a recording device or system, the message can be replayed automatically until the holding party disconnects.

We claim:

1. Apparatus for processing a call which has gone from the talking state to a held state comprising:

means for recording messages;

means responsive to a signal from a holding party for putting a call on hold;

means usable by a held party on a held connection, said held party being on the opposite end of the call from said holding party, for signaling a request to record a message on the means for recording messages; and means for connecting the means for recording messages to the holding party after the holding party has signaled for a return to the held connection, and for playing said message.

2. The apparatus of claim 1 wherein said means for recording said message is connected to the held party's telephone station, and wherein said means for recording is responsive to a reconnect signal from the holding party to play said announcement.

3. The apparatus of claim 1 wherein said means for recording messages is connected to a switch serving said held party.

4. The apparatus of claim 3 wherein said switch is a PBX switch.

5. The apparatus of claim 3 wherein said switch is a central office switch.

6. Apparatus for processing a call which has gone from the talking state to a held state comprising:

- means for recording a message;
- means responsive to a signal from a holding party for putting a call on hold;
- means usable by a held party on a held connection, said held party being on the opposite end of the call from said holding party, for signaling a request to record a message on the means for recording;
- means for connecting said held party to said means for recording; and
- means for connecting said means for recording to a holding party after said holding party has signaled for a return to a held connection and for playing said message;

wherein said means for recording is connected to a central office switch.

7. The apparatus of claim 6, wherein said means for recording messages is connectable on a call waiting call wherein said holding party has placed a waiting call in a held state.

8. The apparatus of claim 1 wherein said call is disconnected after said message has been played back to said holding party.

9. The apparatus of claim 6 wherein said call is disconnected after said message has been played back to said holding party.

\* \* \* \* \*